May 2, 1967 H. L. DAVIS 3,317,030
ARTICULATED-SECTION CONVEYOR STRUCTURE
Filed March 23, 1965 3 Sheets-Sheet 2
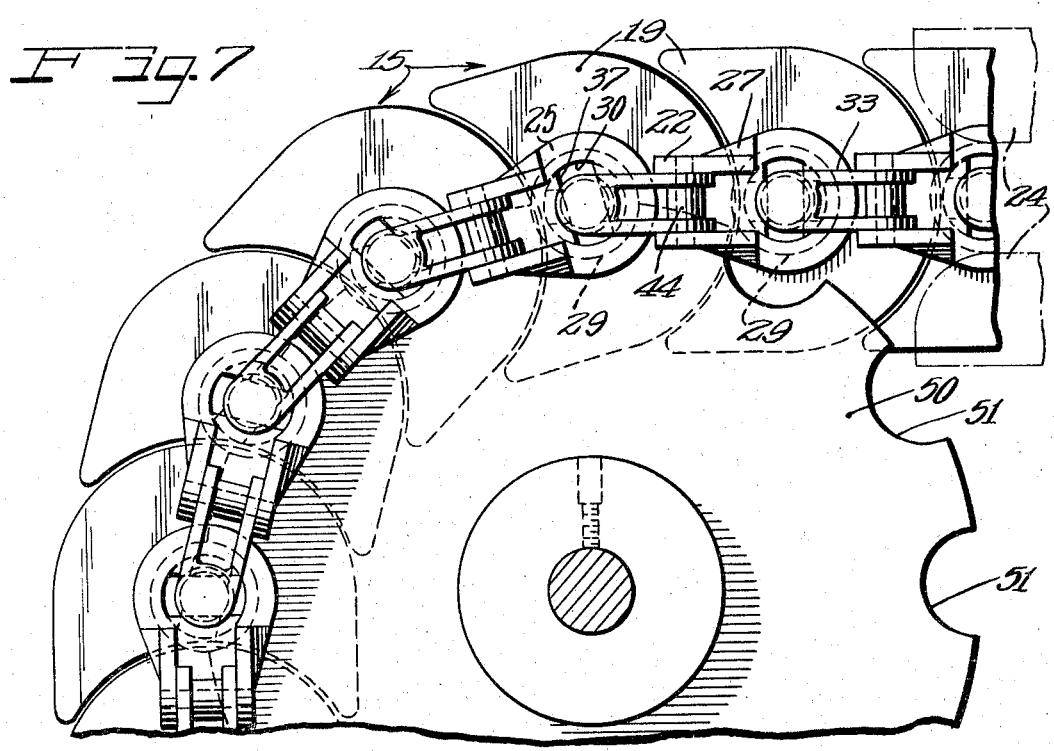
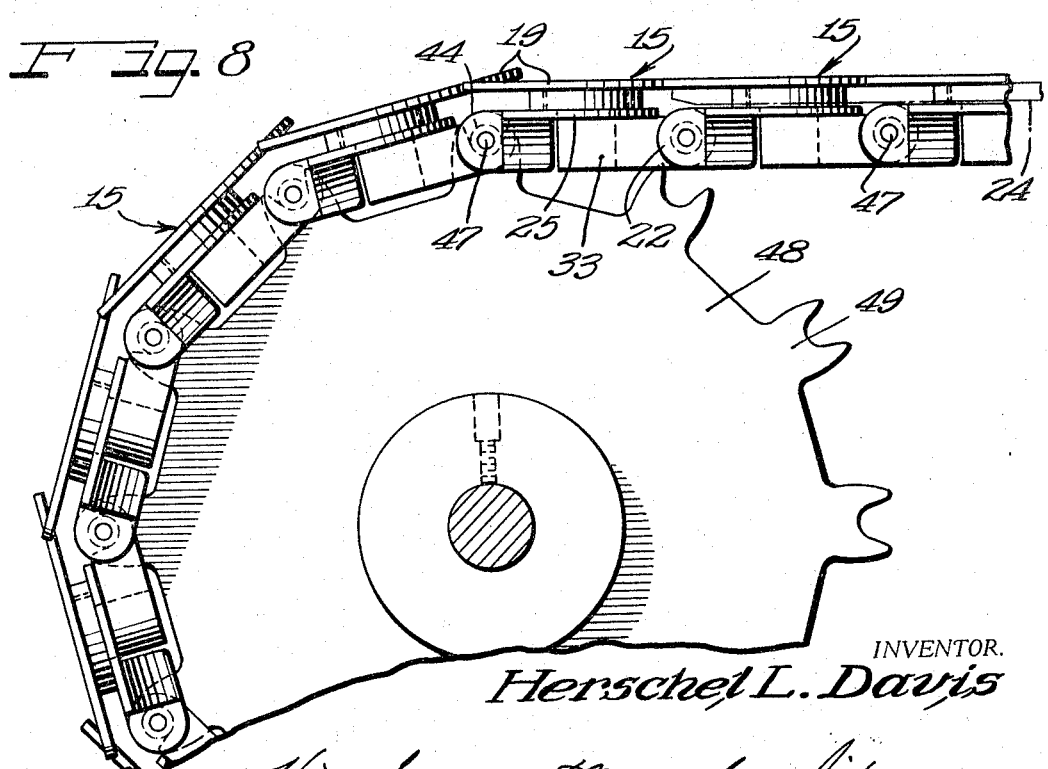
INVENTOR.
Herschel L. Davis

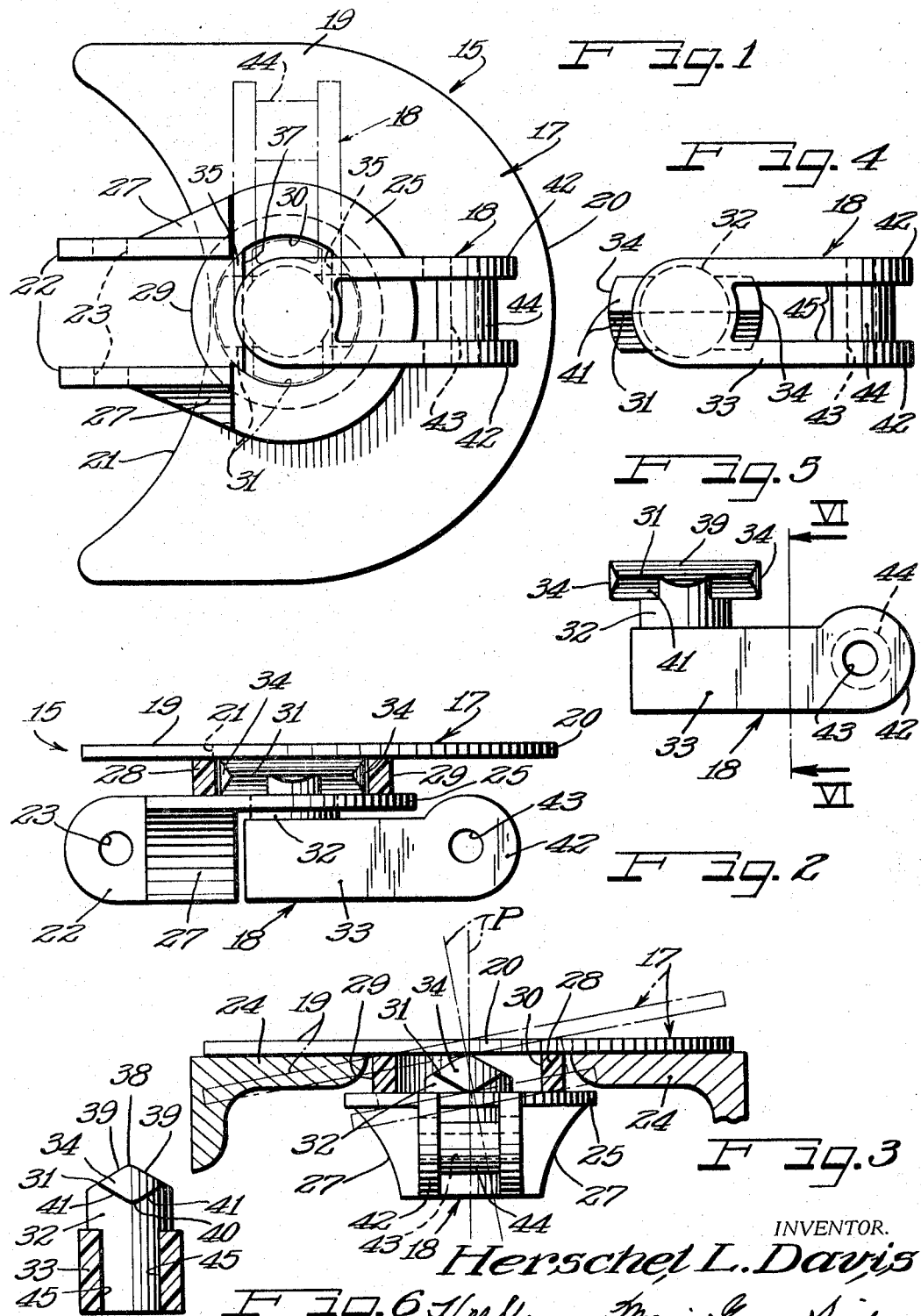

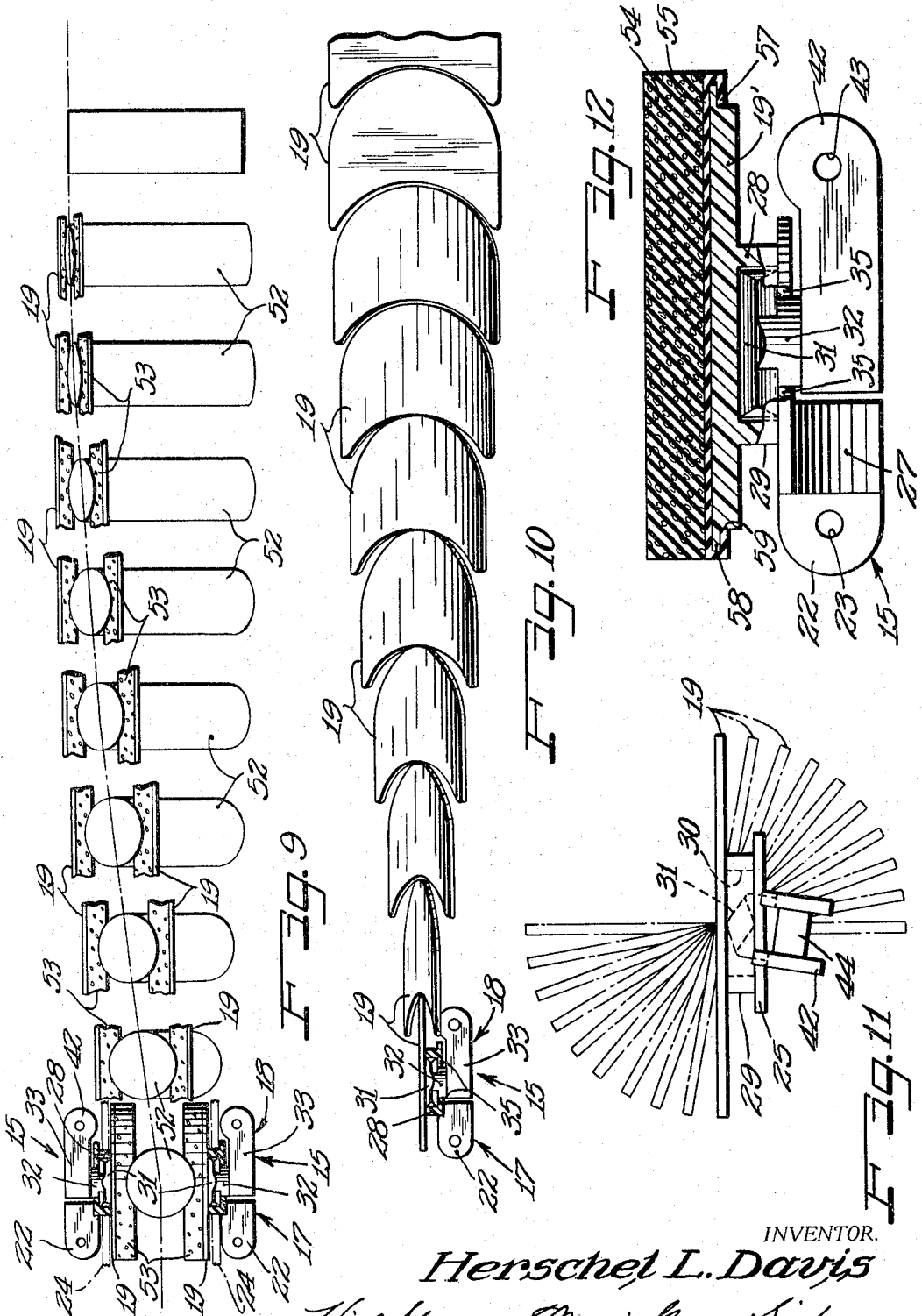

United States Patent Office
3,317,030
Patented May 2, 1967

3,317,030
ARTICULATED-SECTION CONVEYOR
STRUCTURE
Herschel L. Davis, Lombard, Ill., assignor to Alpeda Industries, Inc., Franklin Park, Ill., a corporation of Delaware
Filed Mar. 23, 1965, Ser. No. 441,960
19 Claims. (Cl. 198—189)

This invention relates to improvements in conveyors of generally the endless chain type, and more particularly concerns such conveyors having plastic flights and links.

Plastic chain conveyors have been found to be especially advantageous for service in the food processing industry and for other uses where a high order of sanitation and freedom from attack by acids, alkalies, cleaning fluids, and the like, are essential. Suitable synthetic plastic materials are readily commercially available and lend themselves readily to fabrication by molding.

Although it has been common practice to articulate the links of these chain conveyors on transverse axes so as to enable the same to travel about driving and idler sprockets, no adequate structures have heretofore been provided to afford articulation about axes normal to the transverse axes so as to permit bending of the conveyor to travel laterally with the same ease as about the transverse axes. There has been no capability in prior constructions for articulation about the running axis of the conveyor. Furthermore, in prior constructions undue complexities, loose articulations and other disadvantageous features have been present in the assemblies.

Accordingly, it is an important object of the present invention to provide a new and improved articulated conveyor chain construction which is especially adapted to be made from molded synthetic plastic parts, of simple, rugged structure, which may be easily assembled or separated and which will afford long, efficient and trouble-free service.

Another object of the invention is to provide a new and improved articulated-section chain conveyor structure adapted for angular movements with equal facility about axes transverse as well as normal to the flight plane of the conveyor sections.

A further object of the invention is to provide a new and improved articulated-section endless chain conveyor construction capable of articulation about three principal axes.

Still another object of the invention is to provide in an articulated-section conveyor chain structure new and improved means for effecting articulated assembly of the components.

Yet another object of the invention is to provide a new and improved endless conveyor chain section consisting of a pair of members having novel complementary combination interlocking and swivel structures and together providing a conveyor chain link.

A still further object of the invention is to provide a new and improved articulated chain conveyor link and supporting panel section assembly.

A yet further object of the invention is to provide a new and improved conveyor chain structure affording roll over swivel capability longitudinally along the flight.

It is also an object of the invention to provide a new and improved chain conveyor construction having novel cushioned frictional gripper means by which articles are adapted to be carried between opposed co-running conveyor flights.

Yet another object of the invention is to provide a new and improved chain conveyor construction having novel means for rail guiding of the conveyor.

Other objects, features and advantages will be readily apparent from the following detailed description of certain preferred embodiments thereof taken in conjunction with the accompanying drawings, in which:

FIGURE 1 is a bottom plan view of an articulated section or link for a chain conveyor;

FIGURE 2 is a side elevational view of the articulated section, partially in section to show details of structure;

FIGURE 3 is an end elevational view, partially in section of the articulated conveyor link and showing the same associated with supporting and guide rails;

FIGURE 4 is a bottom plan view of one of the link sections;

FIGURE 5 is a side elevational view of the link section;

FIGURE 6 is a fragmentary sectional elevational detail view taken substantially on the line VI—VI of FIGURE 5;

FIGURE 7 is a fragmentary elevational view showing one manner of running the conveyor angularly;

FIGURE 8 is a fragmentary elevational view showing another manner of running the conveyor angularly;

FIGURE 9 is a schematic view illustrating use of the conveyor for carrying and turning articles;

FIGURE 10 is a schematic illustration of the manner in which the conveyor is adapted for swivelling about its flight axis;

FIGURE 11 is a schematic illustration looking longitudinally along the conveyor flight and showing progressive steps in swivelling of the same on its longitudinal axis; and FIGURE 12 is a side elevational view, partially in section, showing an articulated link or section having a removable cushioning and gripping pad thereon.

Referring to FIGURES 1–6, a typical chain conveyor link section 15 and details thereof embodying features of the invention are depicted. It comprises two components, namely, a conveyor component 17 and coupled in predetermined articulated relation therewith a link component 18. Both of the components 17 and 18 are constructed as units which are readily molded as one piece structures from suitable synthetic plastic material.

In a desirable construction, the conveyor component unit 17 comprises an article-engaging flat supporting slat flange head panel 19 of suitable width constructed and arranged at its opposite ends to cooperate with like head panels of immediately adjacent sections in a chain conveyor for relative articulated movement. For this purpose, the panel 19 has one end shaped to provide a semicircular convex edge 20 and has its opposite ends provided with a complementary semicircular concave edge 21. On one face the panel 19 is free for article-engagement, while on its opposite face the panel carries fixedly thereon a connecting link structure comprising a pair of spaced parallel, coextensive connecting ears 22 which, in this instance, project in the direction of the end 21 and are equally spaced on opposite sides of the longitudinal axis of the conveyor section. Aligned respective connective pivot pin receiving holes 23 are provided in the ears 22.

In order to enable the conveyor section 15 to be supported by and run on aligned, coextensive and properly spaced opposed track flanges 24 of a conveyor framework, or other desirable conveyor flight or run supporting means, the over-all width of the link ears 22 and their connecting means to the head panel 19 is such as to afford substantial width of the panel at each side thereof to engage slidably with the supporting structure. For ready and minimum frictional sliding engagement of the supported face portions of the panel such face portions may be provided with so-called self-lubricating plastic, or the entire unit may be made from such a plastic material, such materials being well known and readily available commercial products.

In a practical, rugged construction, unitary attachment of the link ears 22 to the head panel 19 is accomplished by means of a generally horseshoe shaped connecting flange 25 integral with other sides of the margins of the ears 22 nearest the panel 19 and extending inwardly from the inner ends of the ears which are otherwise blunt at such inner ends. Respective reinforcing filler struts 27 connect the outer sides of the ears 22 inwardly from the end apertures 23 and preferably throughout the width of such sides with the flange 25. Integral attachment of the flange 25 to the head panel 19 is by means of a cylindrical spacer flange 28 which is concentric with the radius of curvature of the end edge 20 and beyond the outer perimeter of which the connecting flange 25 projects to a predetermined but limited extent to define with the spacer flange 28 and the opposed back face of the head panel 19 a generally annular groove 29 within which the edges of the rails 24 are adapted to be accommodated for guiding the conveyor section.

In addition to its other functions, the spacer flange 28 serves as means for coupling the components 17 and 18. To this end, the flange 28 is internally cylindrical and defines a coupling socket 30 within which is receptive a coupling head 31 integral with one end of a swivel trunnion 32 which projects integrally from one end portion of an elongated link body 33 of the link component 18. As will be observed, the trunnion 32 is of differentially smaller diameter than the cylindrical wall defining the socket 30 and the head 31 extends longitudinally beyond opposite sides of the trunnion to a diameter which is slightly less between opposite end surfaces 34 than the diameter of the cylindrical socket wall which they oppose.

Means are provided to facilitate simple manipulative coupling assembly of the members 17 and 18, and to effect a highly efficient and reliable interlocked swivel relationship of the coupled members. To this end, opposed, identical, coplanar, spaced chordal interlock retainer flanges 35 are provided integrally on the socket mouth end of the spacer flange 28 and are preferably in a plane with the attachment flange 25. Between their opposed edges, the interlock flanges 35 define an entry or assembly slot 37, the width of which is substantially the same as the diameter of the trunnion 32 so as to afford a sliding bearing fit therewith. Desirably, the slot 37 extends normal to the longitudinal axis of the conveyor section 15. By having the head 31 no wider than the diameter of the slot 37 passage of the head through the slot for assembling the head into the socket 30 is readily effected by initially longitudinally aligning the member 18 with the slot 37, and the head 31 with the socket 30, and relatively moving the members 17 and 18 toward one another until the head is fully assembled within the slot. Then, by simply relatively turning the members to swing the link member 18 away from the retaining ears 22 an interlocked coupled swiveling relationship of the members is effected by retention of the projecting portions of the head 31 within the chordal socket areas between the interlocking and bearing flanges 35 and the opposing socket base wall afforded by the panel 19. Thus, the members 17 and 18 will remain in the swivelly coupled relationship throughout a substantial swivel range which is ample for all practical purposes and throughout which range the interlock head 31 is prevented from escaping from the socket 30 by the partial socket-mouth closure afforded by the interlock flanges 35.

In addition to the relative swiveling capability of the conveyor section members 17 and 18, it is desirable to afford a practical range of relative rocking movement thereof about a longitudinal axis. Accordingly, the interlock head 31 is constructed in generally diamond-shaped cross-section affording a longitudinal crown ridge 38 which is in substantially line contact sliding bearing opposition to the base closure wall of the socket 30 defined by the panel 19. At each side of the contact bearing ridge 38, the head 31 slopes away on divergent, herein diagonal, rocking clearance faces 39. Complementally to the ridge 38, the directly opposite sides of the longitudinal extension portions of the head 31, identical, longitudinally aligned line contact bearing ridges 40 are provided which freely slidably bearingly oppose the inner faces of the interlock flanges 35. Sloping rocking clearance faces 41 diverge, in this instance obliquely, from the ridges 40. In this arrangement, a substantial range of relative rocking of the members 17 and 18 is enabled about a longitudinal axis through the head 31 in either rotary direction about such axis. In FIGURE 3 a relatively rocked shifting of the members is indicated by the dash-outline of the member 17, with the vertical plane line P correspondingly displaced and demonstrating how such rocking displacement occurs substantially on the longitudinal axis of the head 31. It will be readily apparent how this feature can be utilized advantageously for guiding the conveyor section by suitable formation of the track flanges 24 in relatively spiral paths wherein the panel 19 can be progressively moved into any angle relative to the horizontal or vertical, even to full turn-over of its article-engaging face. Another function of the head 31 is to maintain a satisfactory working spaced relationship of the body 33 of the link member 18 from the attachment flange 25. This is accomplished by engagement of the head ridge 38 with the socket bottom surface, and a suitable length in the trunnion 32. Engagement of the bearing ridges 40 with the respective interlock flanges 35, and opposition of the end faces 34 to the cylindrical socket wall minimizes relative slack movement between the members 17 and 18. Longitudinal slack is virtually eliminated by the sliding bearing engagement of the trunnion 32 with the bearing edges of the flanges 35 within the slot 37. Nevertheless, lateral freedom of the trunnion 32 in the slot 37 is afforded for the relative rocking movements of the members 17 and 18.

At least on its distal end portion, the body 33 of the link member 18 is provided with a link head 42 of a width to be received in pivotal bearing relation between the connecting ears 22 of a companion conveyor section 15. This link head portion has therethrough a transverse pin bore 43 which, in assembly with the companion connecting ears 22 aligns with the pin bores 23. Concentrically about the pin bore 43 is provided a cylindrical cog-hub 44 for a suitable length between spaced guide walls 45 within the link body 33.

In use, a series of the articulated conveyor sections 15 are joined in an endless chain conveyor by means of suitable pins 47 extending through the aligned pin bores 23 and 43 of the pivotally joined ears 22 and link heads 42. Then, driving of the conveyor is adapted to be effected by means of a suitable driving cogwheel 48 having suitably recessed cogs 49 which engage drivingly with the cog hubs 44 to actuate the conveyor. In view of the guide channel structure afforded between the panel 19 and the connecting flange 25, guiding of the chain conveyor may be effected entirely by the rail flanges 24, if desired, with the driving cogwheel 48 located at any desired location along the conveyor chain, although a convenient location is at the on-running or off-running end of a flight as represented by FIGURE 8.

By having a portion of the spacer flange 29 extending beyond the concave panel edge 21, a supporting shoulder is afforded to underlie the margin of the panel 19 contiguous the convex edge 20 of a joined companion conveyor section. This affords stability against sagging in transitional gaps between the ends of guide tracks and cogwheels, and the like, in the upper or conveying run of the conveyor.

As depicted in FIGURE 7, the present chain conveyor is especially adapted by virtue of the swivel couplings of the component members 17 and 18 of the sections, for relatively small radius lateral translation as, for example, about a driving cogwheel 50 which has in its perimeter recesses 51 complementary to and engageable with the cylindrical outer drum perimeter 29 of the spacer flanges 28 serving as driving or cog hubs for this purpose. Driving of the conveyor by means of the recessed perimeter cogwheel 50 may be in any preferred attitude of the conveyor, whether facing upwardly or downwardly or sidewardly, or any intermediate position, because not only does the wheel afford driving connection through the flange hubs 28, but by virtue of the guide channel arrangement between the panels 19 and the associated flange 25, an effective supporting relationship of the wheel with respect to the conveyor sections 15 is attained.

In FIGURE 9 is demonstrated how opposed conveyor sections 15 are adapted to be utilized for gripping an article 52 therebetween. For this purpose, the respective panels 19 of the conveyor members 17 are desirably faced with frictional cushioning and gripping means such as sponge or foam rubber in a layer 53 of suitable thickness. In such an arrangement, the conveyor sections are adapted to be guided by respective conveyor frame tracks 24. Moreover, by utilizing the advantageous rocking articulation of the members of the conveyor sections, guiding of the conveyor sections by appropriate spiral progression of the guide rails enables turning of the article 52 which may, for example, be a container. As shown, by way of example, the container 52 can be gradually turned until its axis is disposed 90° to disposition of its axis at the beginning of the article-turning run. By an extension of such progressive turning, the container can be completely inverted and delivered in its inverted condition or returned by the same conveyor to the original attitude of the container whether end-up or bottom-up, as preferred.

FIGURES 10 and 11 demonstrate how a succession of the conveyor sections 15 are adapted to be turned about the longitudinal axis as the conveyor advances, or the manner in which the article opposing panel 19 of one of the sections progressively turns from one plane to a plane normal thereto progressively and in sequence, in this instance in ten steps.

In FIGURE 12 is shown a modification wherein the conveyor section 15 has mounted on its article-opposing panel 19' a resilient frictional sponge or foam rubber-like article gripping and cushioning pad which is affixed to a mounting cap 55 of solid elastic rubber-like material provided with an underturned elastic retaining flange 57 engageable about a lip 58, about the edge of the panel 19' and provided with a recessed rabbet groove 59 to accommodate the flange within the back face plane of the panel so as to avoid interference with free sliding engagement of such back face with guide rails of a conveyor frame or driving wheel means. This form of cushion is advantageous in that it can readily be replaced if damaged or worn, or may be omitted if it is desired to use the conveyor without such gripping and cushioning pads.

From the foregoing it will be apparent that there has been provided by the present invention a highly versatile chain conveyor construction in which the linked sections enable pivoting about three axes of revolution, namely, two axes transverse to the conveyor and normal to each other, and an axis longitudinally of the conveyor. In each of the two transverse axes, bending of the conveyor chain about substantially similar radii of curvature is enabled. Along the longitudinal pivoting axis, turning capability of the sections is such as to enable efficient and rapid operational tilting and turning of the respective sections within a relatively short span of guided travel. All of these, and other, desirable and advantageous attributes are attained with a chain section structure comprising in a highly efficient arrangement only two rugged complementary and coacting members affording an article engaging chain link articulated assembly.

It will be understood that modifications and variations may be effected without departing from the scope of the novel concepts of the present invention.

I claim as my invention:

1. An articulated-section conveyor structure comprising,
    a series of conveyor sections,
    each of said sections comprising a pair of articulated members one of which has an article-opposing panel extending sidewardly thereon,
    means providing an articulated pivotal coupling of the members,
    means connecting the members of the respective sections to respective members of adjacent sections to connect all of the sections in conveyor series,
    grooved sidewardly opening means including said panel on said one of the members of each of the sections,
    and guide structure engaging in said grooved guide means and guiding the sections in an angular path involving pivoting of said couplings.

2. An articulated-section conveyor structure comprising,
    a pair of chain conveyors to run along operatively adjacent longitudinal paths and each of which comprises an articulated series of conveyor sections in which each of the sections has a pair of members and means coupling the members and comprising bearing surfaces having their surfaces of revolution extending longitudinally of the respective conveyor paths for relative operative rocking movement of the members about an axis longitudinally of the associated chain,
    each of said sections having an article-engaging portion,
    means guiding said conveyor chains with the article-engaging portions opposed and adapted to engage respective articles between each opposed set of sections,
    said guiding means being longitudinally spiral and thereby controlling the sections in movement therealong to rock about said longitudinal axis and within a relatively short distance along said path turn the article engaged thereby.

3. An articulated conveyor section comprising a pair of members,
    one of said members having a circular socket having a base at one end and a mouth at its opposite end partially closed by a pair of chordal flanges affording opposed bearing edges and defining an entry slot into the socket,
    and a second member having a trunnion extending through said slot in bearing engagement with said bearing edges and carrying an elongated head within the socket closely opposing the socket walls and interlockingly coacting with the chordal flanges to maintain the members in assembly,
    said head being narrower than said slot and being adapted for insertion and removal through said slot by relatively turning the members to align the head with the slot,
    said head having opposite longitudinally extending contact slidable bearing ridges engaging respectively said base and said chordal flanges and from which ridges the sides of the head slope to afford clearance enabling the members to be rocked about a longitudinal axis through the head.

4. A chain conveyor section comprising link means and an article-opposing panel,
    said panel having a marginal flange,
    and a cushioning and gripping cap having elastic flange means releasably engaging said panel flange and an article-engaging and cushioning pad overlying said panel.

5. A chain conveyor section comprising:
    link means including an article-opposing panel having a front face and a back face;
    a marginal flange on said panel having on the back face thereof a rabbet groove;
    and a cushioning and gripping cap having a cushioning pad overlying said panel and elastic flange means including an underturned flange engaging said marginal flange and having an underturned flange portion engaged in said rabbet groove and being entirely within the plane of said back face so that said back face is adapted to engage slidably with a guide flange structure without interference from said elastic flange portion.

6. An articulated conveyor section comprising a pair of members:
   one of said members comprising a panel having an article-opposing face and a back face provided with a socket-defining structure projecting therefrom and having a flange defining with said back face a groove within which conveyor-guiding means are engageable;
   link ears on said flange;
   the other of said members having a trunnion in coupled relation within said socket and link means extending oppositely to said link ears;
   and means releasably retaining said trunnion in said socket.

7. A conveyor section as defined in claim 6, in which said link ears are spaced from said back face, and reinforcing filler struts connect said ears and said flange.

8. An articulated conveyor member comprising:
   a flat panel including a back face and an article-opposing opposite face;
   a circular flange projecting from said back face and defining a socket opening away from said back face and receptive of a trunnion of a companion link member;
   a generally horseshoe-shaped flange about the open end of said socket and opposing said back face in spaced relation whereby to define a guide groove receptive of guide means in a conveyor assembly;
   and link means attached to said flange enabling the member to be coupled with another member in a chain conveyor assembly.

9. A member as defined in claim 8, including reinforcing strut means connecting said link means to the flange.

10. A chain conveyor member comprising:
    an elongated connecting link having a link head at one end for articulated connection to link means of a companion member in a conveyor chain series;
    a trunnion projecting from the opposite end portion of the member for articulated engagement within a socket of a second conveyor member;
    and a retaining head on said trunnion.

11. A member as defined in claim 10, in which said retaining head is elongated and extends in the same longitudinal direction as the link and to opposite sides of said trunnion in spaced relation to the link and has longitudinal bearing ridge surfaces thereon.

12. A chain conveyor for traveling along a longitudinal operating path and comprising:
    an articulated series of article-engaging sections;
    each of said sections comprising a pair of articulated members;
    each of said members having a coupling structure which is complementary to the coupling structure of its pair mate and interengaged therewith;
    said coupling structures having opposing bearing surfaces in longitudinally substantially line contact relation enabling substantial operative relative turning of said members about a rotary axis which is substantially longitudinally aligned with said path;
    and means connecting the sections serially to one another in the conveyor comprising cooperative bearing surfaces affording operative articulation about a rotary axis which is transverse to said longitudinal axis.

13. A chain conveyor as defined in claim 12, in which one of said members of each pair has an article-engaging panel, and said axes being parallel to said panel.

14. A chain conveyor as defined in claim 12, including means supporting the conveyor, and one of the members of each of the sections and said supporting means including cooperating guide means for guiding the conveyor to effect progressive turning of said members of said sections about said longitudinal axis.

15. A chain conveyor as defined in claim 12, in which said coupling structures comprise a rigid bearing socket on one of said members and a bearing head on the other of said members engaged in said socket, and said socket and said bearing head having said longitudinal bearing surfaces.

16. A chain conveyor as defined in claim 15, in which said socket and said bearing head also have cooperating bearing surfaces enabling rotary movement of said members relative to each other about an axis extending transverse to said longitudinal axis.

17. A chain conveyor as defined in claim 12, in which said coupling structure on one of said members has grooved guide means opening laterally of said path for engagement by complementary guiding structure for the chain conveyor.

18. A chain conveyor as defined in claim 17, in which said grooved guide means comprise opposed flanges on said one member.

19. A chain conveyor as defined in claim 17, in which said coupling structure of said one member includes a cylindrical hub and said grooved guide means are on said hub.

References Cited by the Examiner

UNITED STATES PATENTS

| | | | |
|---|---|---|---|
| 2,021,748 | 11/1935 | Schaefer | 198—189 |
| 2,619,843 | 12/1952 | Kampfer | 198—189 X |
| 3,243,035 | 3/1966 | Ratkowski | 198—196 |

FOREIGN PATENTS 801,157  9/1958  Great Britain.

EVON C. BLUNK, *Primary Examiner.*

EDWARD A. SROKA, SAMUEL F. COLEMAN,
*Examiners.*